United States Patent [19]

Bretschneider et al.

[11] 4,125,844
[45] Nov. 14, 1978

[54] MAGNETIC POSITION MARKER FOR A TAPE RECORDER USING MAGNETICALLY ALIGNABLE PARTICLES FOR MAKING THE MARK

[75] Inventors: Hermann Bretschneider, Vienna, Austria; Herman P. Hueber, Eindhoven, Netherlands; Friedrich Louzil, Vienna, Austria; Karl Fischer, Vienna, Austria; Lothar Jäger, Vienna, Austria; Johann Sagan, Vienna, Austria

[73] Assignee: U.S. Philips Corporation, New York, N.Y.

[21] Appl. No.: 871,433

[22] Filed: Jan. 23, 1978

Related U.S. Application Data

[63] Continuation of Ser. No. 755,431, Dec. 29, 1976.

[30] Foreign Application Priority Data

Jan. 15, 1976 [AT] Austria .............................. 24976/76

[51] Int. Cl.² ........................ G03G 19/00; G11B 5/02
[52] U.S. Cl. ..................................... 346/74.1; 360/56
[58] Field of Search ................... 346/74.1; 360/13, 15, 360/56, 137

[56] References Cited

U.S. PATENT DOCUMENTS

| 2,815,216 | 12/1957 | Neumann | 360/13 |
|---|---|---|---|
| 2,955,896 | 10/1960 | Fritzinger | 360/13 |
| 3,169,773 | 2/1965 | Redlich | 360/13 |
| 3,608,846 | 9/1971 | Pieplow | 360/137 |
| 3,630,170 | 12/1971 | Christo | 360/137 |
| 3,683,382 | 8/1972 | Ballinger | 360/56 |
| 3,878,367 | 4/1975 | Fayling | 346/74.1 |
| 3,946,437 | 3/1976 | Ono | 360/137 |

Primary Examiner—Jay P. Lucas
Attorney, Agent, or Firm—Frank R. Trifari; David R. Treacy

[57] ABSTRACT

A cassette tape recorder including a device for making index marks on a strip denoting the position of magnetic tape relative to a magnetic head, the marking strip being on a cassette exterior surface and having magnetically alignable particles by which visible, magnetically erasable marks can be made. The marking device includes a controllable magnet for selectively magnetizing an element made of a soft magnetic material which conducts flux to the strip.

In a magnetic tape cassette adapted for such apparatus a strip with magnetically alignable particles is arranged on at least one major flat wall of the cassette, so as to be readily visible.

13 Claims, 6 Drawing Figures

MAGNETIC POSITION MARKER FOR A TAPE RECORDER USING MAGNETICALLY ALIGNABLE PARTICLES FOR MAKING THE MARK

This is a continuation of application Ser. No. 755,431, filed Dec. 29, 1976.

BACKGROUND OF THE INVENTION

1. Field of the Invention

The invention relates to a recording and/or playback apparatus for a magnetic tape which cooperates with at least one scanning element (hereinafter referred to as a tape recorder), and more particularly to a tape cassette recorder having a marking device for selectively applying index marks which identify the position of a magnetic head relative to the magnetic tape in at least one marking zone of a marking carrier. Such tape recorders have at least one marking element which is movable along the marking zone in synchronism with the relative movement between the magnetic tape and the head.

2. Description of the Prior Art

Such apparatus is for example described in U.S. Pat. No. 2,218,542 and is in particular intended for dictation purposes. The user of such apparatus can make optically identifiable marks in the form of punched-out slits in paper marking-carriers by using the marking elements of the marking device.

In addition, a number of other apparatus with marking devices and marking carriers are known, by means of which index marks are made in accordance with different methods, as by scribing on the marking carrier, by the removal of a layer of a special material from the marking carrier, by burning in a mark on a thermographic marking carrier, and the like, for example, see U.S. Pat. No. 2,898,112 and the published German Patent Application No. 1,224,526. All these devices are more or less intricate and expensive, demand a comparatively large amount of power for the application of the marks and produce marks on the marking carrier which cannot be erased, or are erasable only with great difficulty, so that a large number of interchangeable marking carriers must be supplied with such apparatus.

A carrier with magnetically alignable particles for the storage and visual read-out of information is also known from U.S. Pat. No. 3,683,382. This patent teaches that a visible image of a magnetic or electrostatic force field can be obtained by impressing the field on a continuous web or sheet of material having tiny liquid-containing chambers having field-alignable particles in the liquid, and gives examples of use of such a material for making visible graph lines on a strip chart recorder, x-y recorder or the like.

SUMMARY OF THE INVENTION

The object of the invention is to provide an easily constructed tape recorder apparatus by which index marks can be readily made and erased.

According to the invention, a strip having magnetically alignable particles which store visible marks is mounted on an external surface of the cassette in a tape recorder, and the marking device comprises a controllable magnet for selectively magnetizing a marking element made of a soft-magnetic material which conducts magnetic flux to the strip.

An advantage of the invention is that the marking element need not exert mechanical force on the marking carrier. Further, the process in the marking carrier is magnetically reversible, so that marks can be magnetically erased. As a result the user of a tape recorder according to the invention need no longer have a large number of marking carriers at his disposal because the strip on the cassette is reusable.

Because of its particularly simple construction in a preferred embodiment the controllable magnet is constituted by a permanent magnet which is pivotable from a rest position towards the marking element. In a recorder having two marking elements which are each associated with a different marking zone of the marking carrier the permanent magnet can then be pivoted from its rest position towards either the one or the other marking element in an effective manner. Thus, marks can be made by simply pivoting a permanent magnet, with no appreciable forces required.

A very simple construction is also obtained when in accordance with the invention the controllable magnet is constituted by a coil mounted on the marking element which coil can be energized electrically.

For erasing marks made on such a marking strip an erase device is used which produces a magnetic field whose lines of force extend substantially in the plane of the strip, as described in the cited U.S. Pat. No. 3,683,682. In this respect in a preferred embodiment of an apparatus in accordance with the invention a permanent magnetic and/or electromagnetic erase device has a guide track for the passage of the marking strips through the magnetic field. Thus, a marking strip can easily be erased before it is used, by passing it for example manually along the guide track through the magnetic field of the erase device, the guide track defining a suitable location relative to the magnetic field. For utmost simplicity of operation the guide track is constituted by a drop shaft with an entrance opening and an exit opening.

The invention also relates to a magnetic-tape cassette which is destined for use in a tape recorder in accordance with the invention. On at least one external surface or wall of such a cassette, a marking carrier in the form of strip having magnetically alignable particles for the storage and optical read-out of marks is provided so as to be visible. Such a special strip may simply be glued to the outer surface of the top, or major flat cassette wall. Thus the cassette and the marking carrier form a single unit, whose two parts are jointly handled, so that there is no risk that a marking carrier belonging to a specific cassette is mislaid or is interchanged with other carriers. In particular when the cassette in accordance with the invention is used as a dictation cassette this yields the important advantage that a person transcribing dictation on the cassette can directly read marks on the cassette, such as marks denoting the beginning and end of the dictation, special instructions with respect to inserts in the dictation etc.

Combining a magnetic tape cassette with a marking strip utilizing magnetically alignable particles, furthermore, yields the advantage that when the marks are made no mechanical forces are exerted on the marking carrier and the cassette respectively. As such a special marking strip can be erased, the carrier is reusable.

As an alternative, the marking carrier may be placed in a compartment provided in a wall of the cassette, for easy replacement in the event of damage when handling or transporting cassettes.

The invention will be described hereinafter in more detail with reference to the drawing which shows some

DESCRIPTION OF THE PREFERRED EMBODIMENTS

Figure 1:
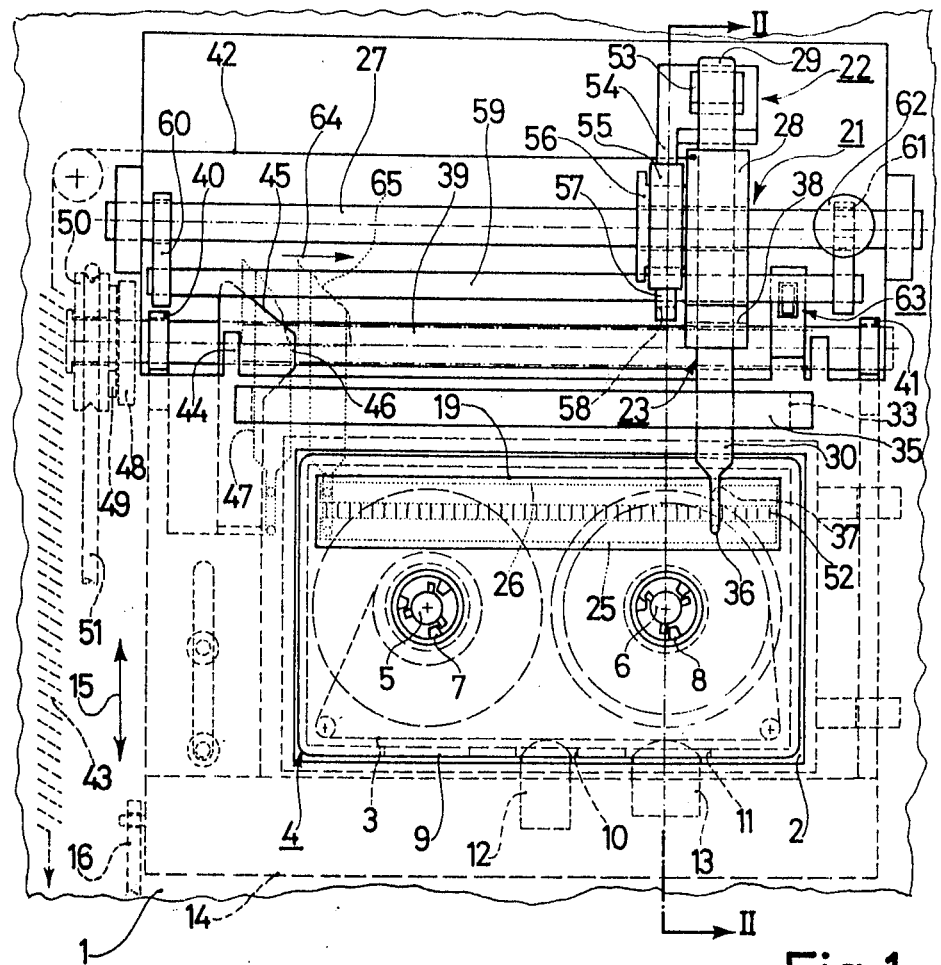
FIG. 1 is a schematic plan view of a cassette tape recorder including a cassette in accordance with the invention.
Figure 2:
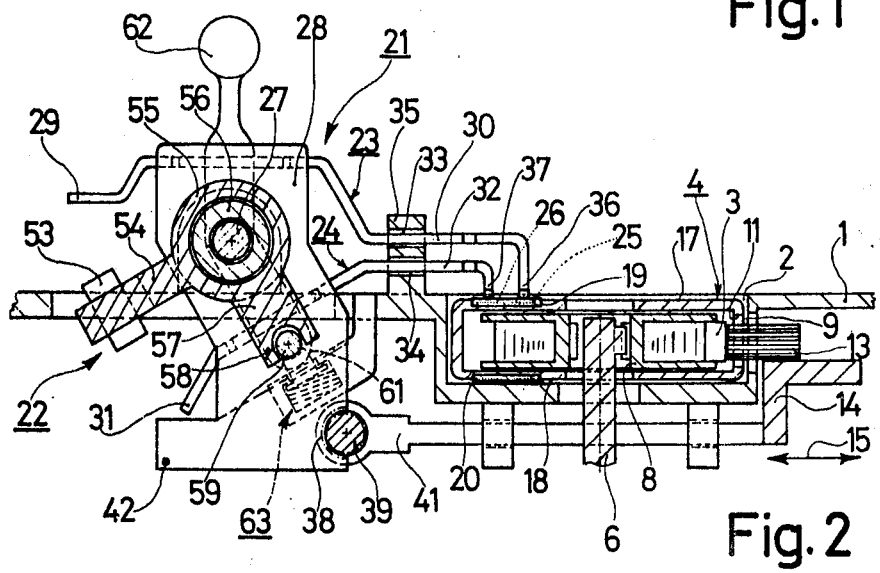
FIG. 2 is a sectional side view of the apparatus of FIG. 1 in along the line II—II.

In accordance with FIGS. 1 and 2 a tape recorder particularly adapted for dictation comprises a housing 1 having a recessed portion 2 in which is placed a cassette 4 containing magnetic tape 3. Drive spindles 5, 6 located in the apparatus engage winding hubs 7, 8 of the cassette 4 in a conventional manner, so that the magnetic tape can be unwound from one winding hub and wound onto the other winding hub. The magnetic tape 3 then runs along a narrow side 9 of the cassette in which openings 10, 11 are formed, through which scanning elements or heads such as an erase head 12 and a recording/playback head 13 extend for magnetic coupling with the magnetic tape. The heads are mounted on a base 14, which is movable in the apparatus in the direction of the double arrow 15. Actuation means 16 which can be operated by a control element (not shown) engage the base 14, so that the scanning element can be withdrawn from the cassette into a rest position. In the situation shown in FIG. 1 and FIG. 2 the heads are in contact with the magnetic tape, and part of the length of magnetic tape has already been transported from the hub 7 to the hub 8.

The recorder is provided with a marking device for a marking carrier on which marks can be made in a selective manner, which marks denote the relative position of the heads with respect to the magnetic tape, so that for example if the apparatus is used for dictation purposes the beginning and the end of the dictation or a correction can be identified. For this purpose an elongated planar marking strip 19, 20 is provided on each of the two major wall surfaces 17, 18 of the cassette 4, said strip carrying magnetically alignable particles for the storage and visual read-out of a mark. In such a carrier the magnetically alignable particles, depending on whether they have been exposed to a magnetic field which extends in the plane of the strip or perpendicular to said plane, may assume two different orientations, so that in one orientation they reflect incident light and in the other orientation they diffuse the incident light in the carrier material where it is then absorbed so that the strip appears is bright in the first instance and appears dark in the second instance.

In the preferred embodiment of FIGS. 1 and 2 the marking strips are glued in position parallel to the longitudinal direction of the cassette in corresponding recesses formed in the walls 17, 18 of the cassette. Each of the two marking strips then corresponds to a direction of transport of the magnetic tape from the supply spindle and hub to the take-up spindle and hub, depending on the position in which the cassette has been inserted into the apparatus. The strip which faces the outside of the apparatus and is visually discernible to the user is the one in the operating condition. Thus, there is a fixed connection between each cassette and strip, so that they cannot be mislaid or be interchanged, for example during transport of a cassette. Since the magnetically stored and visually readable marks can be erased magnetically, because of the reversible orientation process of the particles of the carrier, the marking strips are always re-usable, after erasure as will be described in more detail hereinafter. This is true even if the same cassette is re-used frequently.

For making marks on the strip in the visible or operating position, a marking device 21 is provided, which comprises a selective magnetizing device 22 for two marking elements 23, 24 which each correspond to a marking zone 25 and 26 on the respective strip and which can be moved longitudinally along these marking zones in synchronism with the relative movement between the magnetic tape 3 and the scanning elements 12, 13. For this purpose, the marking device comprises a stationary shaft 27 along which a block 28 of a nonmagnetizable material, preferably a plastic, is movable. In this block the two marking elements 23 and 24 of a soft-magnetic material are embedded, the portions 29, 30 and 31, 32 projecting from the block 28. The portions 30 and 32 are guided in slots 33 and 34, which are formed in a ridge 35 provided on the housing, and they terminate in bent pin-shaped free ends 36 and 37 located a small distance from and directly above the marking carrier 19. As shown in FIG. 1, the free ends 36, 37 are aligned along a line transverse to their longitudinal movement. Furthermore, a semicircular threaded portion 38 is formed in the block 28, which engages a threaded spindle 39, which is rotatably journalled in bearings 40, 41 mounted on the base 14. By moving the base 14 from the operating position to the rest position, the heads 12, 13 being withdrawn from the cassette, the connection between the threaded spindle 39 and the block 28 is eliminated, in which case a spring 43, which is connected to the block 28 by a belt 42, moves the block into a rest position which is defined by a stop 44 on the housing 1. At the same time a projection 46 formed on the base 14, and having a ramp 45, is moved out of the path of the block 28. In FIG. 1 this rest position is indicated by dotted lines 47. On the threaded spindle 39 a disk 48 is fitted which engages a slipping clutch lining 49 mounted on a pulley 50, the disk being freely rotatable on the threaded spindle. From this pulley 50 a belt 51 runs to a part of the apparatus, not shown, which rotates during transport of the magnetic tape, such as a second pulley on the winding spindle 6. In this way the block 28 together with the marking elements 23 and 24 is moved along the shaft 27 in synchronism with the relative movement between the magnetic tape and the scanning element, the free ends 36, 37 of the marking elements covering the corresponding marking zones 25 and 26 of the strip 19. With the aid of a scale 52 which is printed on the strips one can also tell visually, in a similar way as with a counter, how much magnetic tape is contained on the winding hubs 7 and 8 respectively.

The magnetizing device 22 is formed by a rod-shaped axially magnetized permanent magnet 53 mounted on a radially projecting arm 54 of a ring 55, which is pivotably journalled around a sleeve 56 projecting from the block 28 coaxially with the shaft 27. The ring 55 has a second radially projecting arm 57 with a forked end 58. A bar 59 passing between the arms of the forked end is pivotably journalled at its ends to the shaft 27 by connecting portions 60 and 61 on the shaft 27, and has a handle 62 connected to the portion 60. By tilting the handle 62 and thus the bar 59, the arm 57 and with it the ring 55 as well as the arm 54 and the permanent magnet 53 is selectively pivotable at any arbitrary position of the block 28, so that the permanent magnet can be made to engage either with the magnetizing end or projection 29 of the marking element 23 or the magnetizing end or projection 31 of the marking element 24. A stop 63 which engages with the bar 59, as is shown in FIGS. 1 and 2, defines a rest position of the actuation device for the permanent magnet, in which position this magnet is kept remote from the two ends 29 and 31 of the two marking elements.

When the apparatus is put into operation the base 14 is in its rest position, in which position the heads 12, 13 disposed on it are withdrawn from the recess 2, the block 28 with the marking elements 23 and 24 then also being in its rest position, the block engaging the stop 44. In this rest position of the block 28 the two marking elements, as shown with dotted lines 47 in FIG. 1, are disposed beside the recess 2, so that a cassette 4 can be placed into the recess unimpeded. Subsequently, the base 14 is moved into the operating position, the heads 12, 13 then entering the cassette and engaging the magnetic tape. Simultaneously with this movement of the base 14 the block 28 is moved in the direction of the arrow 64 by the ramp 45 on the projection 46. The ramp is so proportioned that the block is moved clear of the ramp before, as the base 14 moves on, the connection between the threaded spindle 39 and the threaded portion 38 of the block 28 is established. In this position of the block 28, indicated by the dotted lines 65 in FIG. 1, the marking elements 23, 24 have assumed their initial position above the strip 19. When the drive means for the transport of the magnetic tape from the hub 7 to the hub 8 is now switched on, steps having been taken to ensure that, if necessary, the tape is automatically wound completely onto the winding hub 7, the block 28 with the marking elements 23, 24 synchronously follows the movement of the magnetic tape by means of the threaded spindle 39 which is then also driven, the free ends 36, 37 of the marking elements then moving along above the marking zones 25, 26 on the strip.

If a specific point of the magnetic tape in respect of its position relative to the scanning element is to be identified by means on a mark in the marking zone 25 or 26, the lever 62 is pivoted so that the permanent magnet 53 is moved against the magnetizing end 29 of the marking element 23 or the end 31 of the marking element 24. As a result, the selected marking element is magnetized so that the magnetic field which emanates from the free end 36 or 37 respectively passes through the marking carrier substantially perpendicularly to the plane of the strip, the magnetically alignable particles in the underlying area of the strip being influenced in such a way that they are re-oriented compared with their original orientation, and at this point a visible mark is made. Thus, because the free ends 36, 37 need not contact the strip such a mark can be made without mechanically loading any component, neither the marking elements nor the marking carrier, by simply pivoting a permanent magnet.

As the magnetic orientation of the particles of the marking strip is reversible, such marks can also be erased by a magnetic field extending substantially in the plane of the marking strip. In the simplest case marks can be erased with the aid of an axially magnetized rod magnet, which is manually passed over the marking carrier with the circumferential surface transverse thereto. Thus, such a marking strip is re-usable, so that it is no longer necessary to have a large number of interchangeable marking carriers at one's disposal for such an apparatus. Another important advantage is that those who have to transcribe a dictation from such a cassette can directly read from the cassette, marks which denote for example the beginning and end of a dictation, or special instructions relating to inserts in the dictation etc.

Figures 3, 4:
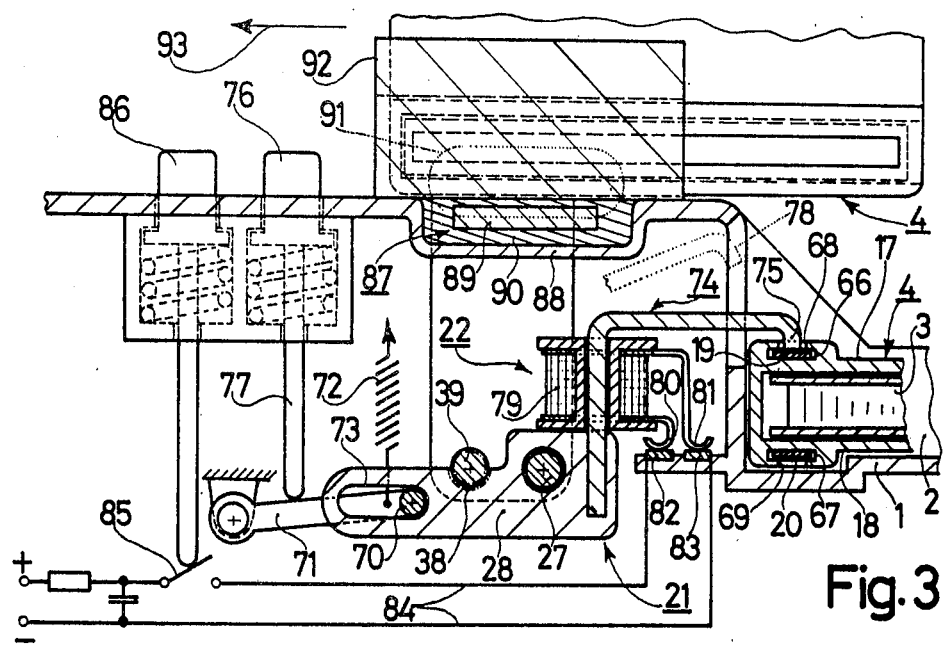
FIG. 3 is a sectional side view, partially schematic, of a second embodiment of a cassette apparatus in accordance with the invention.
FIG. 4 is a sectional side view of still a further embodiment of a cassette apparatus in accordance with the invention.

In another embodiment shown in FIG. 3 the strips 19, 20 which contain the magnetically alignable particles are each inserted in a compartment 66, 67 formed in the walls 17 and 18 of the cassette 4. In this embodiment the compartments each have a window 68 and 69 respectively for visually reading the marking carrier. Of course, if the compartments are made of a transparent material, such windows may be dispensed with.

The marking device again comprises a block 28 which is movable along a stationary shaft 27 and which engages a threaded spindle 39 with a semicircular threaded portion 38, which spindle is driven in synchronism with the transport of the magnetic tape. A U-shaped bracket 71, whose leg 70 is parallel to the shaft 27, is pivotable in the apparatus and a spring 72 loads the part 70 of the bracket, which part runs in a groove 73 of the block 28, in such a way that engagement of the spindle 39 by the threaded portion 38 is assured. As marking element a hook-shaped pin 74 of a soft magnetic material is mounted in the block 28, the pin having a free end 75 extending over the marking carrier 19 on the cassette 4. To permit the insertion or removal of a cassette into or from the apparatus the block 28 may be pivoted about the shaft 27 and thus move the marking element 74 out of the recess 2 to the position shown by the dotted lines 78, by depressing an actuating element 76. A rod 77 depending from the element 76 acts on the bracket 71 to pivot it against the spring 72, the pin 70 pressing against and sliding along the groove 73.

The magnetizing device 22 for the marking element 74 includes a coil 79 provided on the element, electrically connected to two slip contacts 80, 81 that make electrical contact with two contact tracks 82, 83 provided in the reorder. The two contact tracks are connected to an energizing circuit 84, which includes a switch 85 which can be closed by an actuation element 86. When the switch 85 is closed current will flow through the coil 79, independently of the instantaneous position of the block 28, so that the magnetic field produced by the coil is passed from the marking element 74 to the marking carrier 19 and passes through the plane of the carrier substantially perpendicularly thereto, so that again a visible mark is obtained and is recorded.

The apparatus of FIG. 3 is also provided with an erase device 87 for the strip. An axially magnetized rod magnet 89 whose axis is substantially parallel to the housing surface is fitted in a recess 88 formed in the housing 1 of the apparatus, for example by embedding the rod in a plastic 90. Thus, the magnet produces a magnetic field 91 which extends outside the apparatus. For erasure a cassette with marking strips is passed through the erase field by hand, in such a way that this field passes parallel to and through the plane of the strips. To define the proper path to be followed by the marking carriers and the cassette during passage through the field, a guide track for a cassette is provided on the housing 1 above the permanent magnet 89, which track consists of a channel 92 equal in size to the cross-section of the cassette, along which channel a cassette can be moved by hand in the direction of the arrow 93 parallel to the plane of the strip. Thus, the position of the strips 19 and 20 relative to the erase field 91 is accurately defined, so that perfect erasure is guaranteed. A cassette may also be moved automatically along such a guide track.

In the embodiment of FIG. 4 the strip 19 which contains the magnetically alignable particles is mounted on a narrow side wall 94 of the cassette 4, preferably on that wall which is opposite the narrow side 9 through which the heads for the magnetic tape enter. In this case the cassette 4 is placed in a cassette container 95, which is pivoted to the apparatus, the wall 96 of the container which extends parallel to strip 19 having an opening 97 for the passage of the two free ends of the marking elements 23, 24. The two marking elements each act on a respective zone extending along the upper half of the strip, so that when the cassette is turned over, they cover the other half of the strip. In order to make the strip visible to the user of the apparatus, the housing 1 has an opening 98 below which a mirror 99 is suitably arranged. If desired, an illuminating device may be provided.

In this apparatus the erasing device 87 comprises a flat coil 100 which can be energized electrically so as to produce an alternating magnetic field through which a cassette can be passed together with the marking carrier. Again a guide track is provided, in this case taking the form of a shaft 101 whose cross-section is adapted to that of the cassette. The shaft has an entrance opening 102 and an exit opening 103, and extends through the flat coil 100. To erase a strip the cassette is moved in the direction of the arrow 104 into the entrance opening 102, after which the cassette falls through the shaft parallel to the plane of the strip 19, and remains on a bottom wall 105 below the exit 103, from which the cassette can be removed by hand. The strip has then passed through the erase field in such a way that the erase field passes through the carrier in the plane of (parallel to) the strip, so that the marks recorded on the strip are erased.

Figure 5:
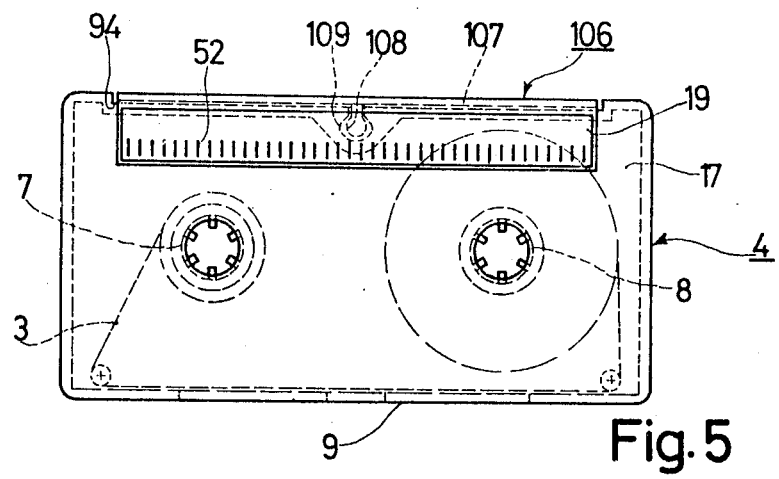
FIG. 5 is a plan view of a magnetic tape cassette in accordance with the invention.

In an embodiment of a cassette shown in FIG. 5 a marking strip is secured to each of the two walls which constitute the major surfaces with the aid of a U-shaped clip 106 made of a transparent material which partly covers the two walls. In FIG. 5 the wall 17 and the strip 19 are thus visible. For fitting the clip onto the cassette a snap connection is provided which consists of a projection 108 formed at the base 107 of the U-shaped clip, which projection engages with a recess 109 formed in a narrow side wall 94 of the cassette. This enables the strip to be exchanged in a simple way. Also, the side walls of the clip provide protection for the strip. Such a cassette together with the marking strip can be passed through an erase device. However, it is alternatively possible to remove the carriers and pass them only through the erase device. According to still another alternative, it is possible to erase the marking carriers on this cassette with the aid of an erase device which is movably disposed on the apparatus, while the cassette is still in the operating position in the apparatus.

Figure 6:
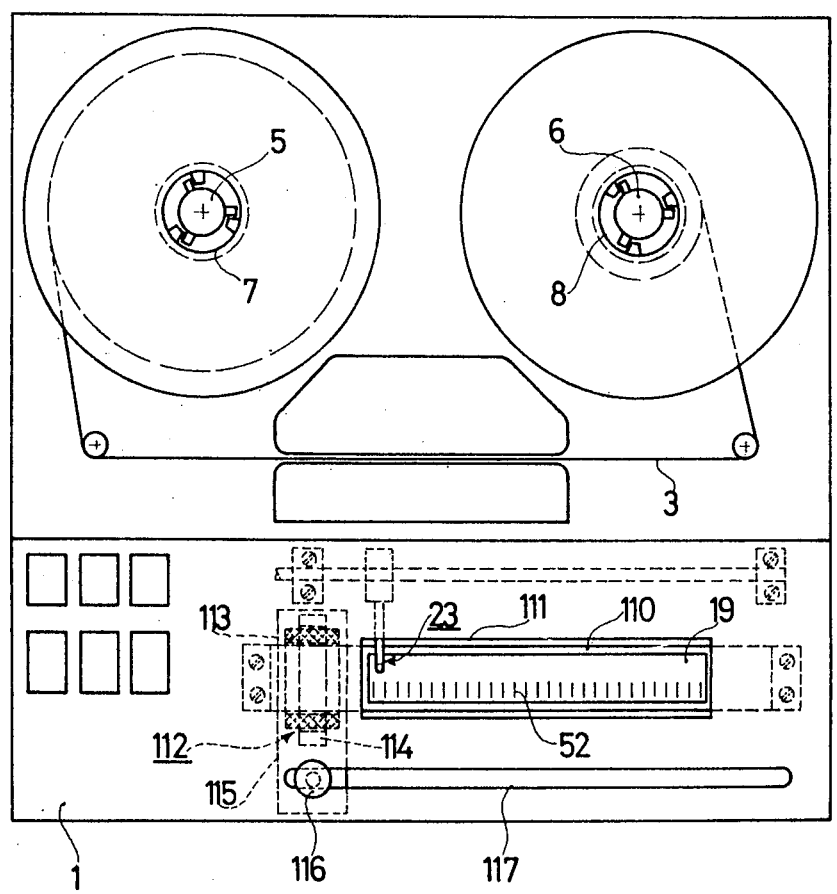
FIG. 6 is a schematic plan view of a reel-to-reel apparatus showing another embodiment of an erasing device for a marking strip.

A cross-field erasing device is shown in the embodiments of FIG. 6 a marking strip 19 with the magnetically alignable particles is secured to a bracket 110 of a non-magnetizable material which is mounted on a reel-to-reel recorder, which bracket is situated underneath a window 111 formed in the housing 1. Associated with the marking strip is a marking element 23 which is movable in synchronism with the relative movement between the magnetic tape and the heads, which element can be magnetized for the purpose of marking in a manner not shown.

For erasing marks a movable erase device 112 is provided, which comprises a flat coil 113, which can be energized electrically and which extends around the bracket 110, and a U-shaped permanent magnet 114, which extends around the coil. The coil 113 and magnet 114 are mounted on a base 115 having a handle 116 which projects through a slot 117 formed in the recorder housing and extending parallel to the bracket 110. By moving the handle 116 along the slot 117 the erase device can be moved over the strip and underneath the marking element 23. Thus, the marking strip is very effectively erased by two mutually perpendicular magnetic fields which extend in the plane of the strip, namely by the field of the flat coil and by that of the permanent magnet, through a corresponding reorientation of the magnetic particles.

Further modifications to the embodiments described hereinbefore are possible within the scope of the invention. For example the marking carrier may also have a shape other than that of an elongated strip, for example a round shape with concentric marking zones.

What is claimed is:

1. A magnetic tape cassette recording system, comprising
    (a) a tape cassette comprising at least one wall having an exterior surface; a planar marking strip affixed to said exterior surface, said strip having at least one marking zone containing magnetically alignable particles which store visually discernible marks in response to application of a magnetic field perpendicular to said strip, said marks being magnetically erasable by application of a magnetic field parallel to the plane of the strip; at least one hub rotatably mounted in said cassette; and a length of magnetic tape wound on said hub, and
    (b) a tape recorder comprising a housing having a recessed portion in which said cassette is placed, so arranged that said strip is visible; a magnetic head; means for driving said tape past said head for recording or playing back information on the tape; a marking element made of a soft magnetic material and having a free end arranged to be visible; means for moving said marking element in a given direction along the marking zone in synchronization with movement of a tape past the head, said free end oriented perpendicular to said strip; means for selectively magnetizing said marking element; and means for selectively applying a magnetic field parallel to the plane of the strip of a cassette of the type described in paragraph (a).

2. A system as claimed in claim 1 wherein said strip has two marking zones; the recorder has two marking elements each having a free end; the means for moving moves the two elements in synchronization with their free ends aligned along respective zones of the strip; and the means for selectively magnetizing includes a permanent magnet and means for moving the permanent magnet from a rest position toward a selected one of said elements.

3. A system as claimed in claim 2 wherein said means for moving the permanent magnet includes means for pivoting said magnet about an axis parallel to said given direction.

4. A system as claimed in claim 1 wherein said strip has two zones, the recorder has two marking elements and two magnetic coils, each coil mounted on a respective marking element; the means for moving moves the two elements in synchronization with their free ends aligned along respective zones of the strip; and the means for selectively magnetizing includes means for electrically energizing a selected one of said coils.

5. A system as claimed in claim 1 wherein said means for selectively applying comprises an erasing magnet, means for mounting the erasing magnet to the housing in a fixed position, and a guide track for guiding a cassette for movement past the erasing magnet in a direction parallel to the strip.

6. A magnetic tape cassette recording system, comprising
(a) a tape cassette comprising at least one wall having an exterior surface; a planar marking strip elongated in a longitudinal direction, affixed to said exterior surface, said strip having two marking zones extending beside each other in said longitudinal direction, containing magnetically alignable particles which store visually discernible marks in response to application of a magnetic field perpendicular to said strip, said marks being magnetically erasable by application of a magnetic field parallel to the plane of the strip; at least one hub rotatably mounted in said cassette for rotation about an axis perpendicular to said surface; and a length of magnetic tape wound on said hub, and
(b) a tape recorder including a housing; means for holding the cassette in an operative position with respect to said housing; a magnetic head; means for driving said tape past said head for recording or playing back information on the tape; two marking elements each made of a soft magnetic material and having a free end and a magnetizing end; means for mounting said elements with their free ends perpendicular to and spaced a given distance from said strip, said free ends being aligned with respect to each other along a line transverse to said longitudinal direction; means for moving said marking elements in a given direction along the marking zone in synchronization with movement of the tape past the head, while maintaining the alignment and spacing of the free ends; and means for selectively magnetizing a selected one of said marking elements.

7. A system as claimed in claim 6, wherein said means for selectively magnetizing includes a single magnet, and means for mounting said magnet for pivotal movement from a rest position toward a selected magnetizing end about an axis parallel to said direction; and said means for moving moves the magnet in the given direction synchronously with said elements.

8. A system as claimed in claim 7 wherein said means for holding includes a recess for the cassette arranged so that the strip is visible to a person transcribing information recorded on the tape; and the recorder includes means for erasing marks on the zones of a strip of a cassette of the type described in paragraph (a), said means for erasing comprising an erasing magnet producing a magnetic field in a given direction and guide means for guiding relative movement between the erasing magnet field and a cassette of the type described in paragraph (a) such that the direction of relative movement and the erasing field given direction are each parallel to the plane of the marking strip.

9. A system as claimed in claim 8 wherein the erasing magnet is mounted to the housing in a fixed position, and the guide means includes a track fixed to the housing.

10. A system as claimed in claim 9 wherein said guide track is formed by a drop shaft having an entrance opening and an exit opening.

11. A system as claimed in claim 8 wherein the means for erasing comprise two magnets producing mutually perpendicular magnetic fields each parallel to the plane of the marking strip.

12. A system as claimed in claim 8 wherein said strip has a scale parallel to and between said zones indicative of the amount of tape contained on said hub, and said free end of at least one marking element is arranged to be visible to a person transcribing information recorded on the tape.

13. A cassette for magnetic tape comprising a housing having at least one wall having an exterior surface; a planar marking strip affixed to said exterior surface, said strip having at least one marking zone containing magnetically alignable particles which store visually discernible marks in response to application of a magnetic field perpendicular to said strip, said marks being magnetically erasable by application of a magnetic field parallel to the plane of the strip; at least one hub rotatably mounted in said cassette; and a length of magnetic tape wound on said hub.

* * * * *